United States Patent
Wei

(10) Patent No.: US 11,261,974 B2
(45) Date of Patent: Mar. 1, 2022

(54) ELECTRONIC EXPANSION VALVE

(71) Applicant: Zhejiang Sanhua Intelligent Controls Co., Ltd., Shaoxing (CN)

(72) Inventor: Xianrang Wei, Shaoxing (CN)

(73) Assignee: Zhejiang Sanhua Intelligent Controls Co., Ltd., Shaoxing (CN)

( * ) Notice: Subject to any disclaimer, the term of this patent is extended or adjusted under 35 U.S.C. 154(b) by 142 days.

(21) Appl. No.: 16/478,422

(22) PCT Filed: Jan. 24, 2018

(86) PCT No.: PCT/CN2018/073923
§ 371 (c)(1),
(2) Date: Jul. 16, 2019

(87) PCT Pub. No.: WO2018/137636
PCT Pub. Date: Aug. 2, 2018

(65) Prior Publication Data
US 2019/0368618 A1 Dec. 5, 2019
US 2020/0355274 A9 Nov. 12, 2020

(30) Foreign Application Priority Data

Jan. 26, 2017 (CN) .......................... 201710056860.0
Jan. 26, 2017 (CN) .......................... 201710056865.3
Jan. 26, 2017 (CN) .......................... 201710056894.X

(51) Int. Cl.
*F16K 1/52* (2006.01)
*F25B 41/30* (2021.01)
*F25B 41/34* (2021.01)

(52) U.S. Cl.
CPC ................ *F16K 1/52* (2013.01); *F25B 41/30* (2021.01); *F25B 41/34* (2021.01); *F25B 2600/2513* (2013.01)

(58) Field of Classification Search
CPC . F16K 1/52; F16K 1/54; F16K 31/508; F16K 31/047; Y02B 30/70; F25B 41/30;
(Continued)

(56) References Cited

U.S. PATENT DOCUMENTS 6,220,571 B1 * 4/2001 Kim .................... F25B 41/31
251/284
2010/0181514 A1 * 7/2010 Ohuchi ................ F25B 41/31
251/264

(Continued)

FOREIGN PATENT DOCUMENTS

CN 2526754 Y 12/2002
CN 2607486 Y 3/2004
(Continued)

OTHER PUBLICATIONS

Cook et al., Injection Nozzle, Jul. 28, 2005, JP2005201272A, Whole Document (Year: 2005).*
(Continued)

*Primary Examiner* — Larry L Furdge
(74) *Attorney, Agent, or Firm* — Wolf, Greenfield & Sacks, P.C.

(57) ABSTRACT

An electronic expansion valve includes: a valve seat, the valve seat has a valve cavity and is provided with a valve port; a valve needle, matching the valve port and used to perform flow adjustment of the electronic expansion valve; a lead screw, forming a floating connection to the valve needle via a barrel portion; and a nut, wherein a threaded fit is formed between the nut and the lead screw, and a lower portion of the nut is provided with a nut guiding portion. A guide component is fixedly connected to the valve seat. The guide component guides both the barrel portion and the valve needle. The electronic expansion valve of the invention is provided with the guide component, and the guide component can guide both the valve needle and the barrel (Continued)

portion, effectively preventing abnormal wear caused by radial deviation of the valve needle and the barrel portion.

23 Claims, 10 Drawing Sheets

(58) Field of Classification Search
CPC .. F25B 41/34; F25B 2600/2513; F25B 41/35; F25B 41/31
See application file for complete search history.

(56) References Cited

U.S. PATENT DOCUMENTS

| | | | |
|---|---|---|---|
| 2014/0283546 A1 | 9/2014 | Wakisaka et al. | |
| 2015/0048266 A1* | 2/2015 | Shen | F16K 17/36 251/69 |
| 2015/0114495 A1* | 4/2015 | Zhan | F16K 15/18 137/596.12 |
| 2015/0122360 A1 | 5/2015 | Zhan et al. | |
| 2015/0184768 A1* | 7/2015 | Zhan | F16K 1/523 251/65 |

FOREIGN PATENT DOCUMENTS

| | | |
|---|---|---|
| CN | 101080601 A | 11/2007 |
| CN | 202149235 U | 2/2012 |
| CN | 102454818 A | 5/2012 |
| CN | 102589205 A | 7/2012 |
| CN | 103388694 A | 11/2013 |
| CN | 103512288 A | 1/2014 |
| CN | 103575000 A | 2/2014 |
| CN | 103912689 A | 7/2014 |
| CN | 103946651 A | 7/2014 |
| CN | 104807259 A | 7/2015 |
| CN | 105202199 A | 12/2015 |
| CN | 105276875 A | 1/2016 |
| CN | 106322861 A | 1/2017 |
| JP | H10220926 A * | 8/1998 |
| JP | 2000-320429 A | 11/2000 |
| JP | 2002295712 A * | 10/2002 |
| JP | 2005201272 A * | 7/2005 |
| JP | 2006-125751 A | 5/2006 |
| JP | 4684305 B2 | 5/2011 |
| JP | 2012-037192 A | 2/2012 |
| JP | 2012-172839 A | 9/2012 |
| JP | 2013-164124 A | 8/2013 |

OTHER PUBLICATIONS

Futami et al., Solenoid Control Valve, Oct. 9, 2002, JP2002295712A, Whole Document (Year: 2002).*
Okano, Motor Expansion Valve, Aug. 21, 1998, JPH10220926A, Whole Document (Year: 1998).*
International Search Report and Written Opinion for International Application No. PCT/CN2018/073923, dated Apr. 18, 2018.
First Office Action for Chinese Application No. 201710056865.3, dated Jul. 31, 2020.
First Office Action for Chinese Application No. 201710056860.0, dated Aug. 3, 2020.
Second Office Action for Chinese Application No. 201710056860.0, dated Apr. 28, 2021.
First Office Action for Chinese Application No. 201710056894.X, dated Aug. 4, 2020.

* cited by examiner

ELECTRONIC EXPANSION VALVE

This Application is a national stage filing under 35 U.S.C. § 371 of International Patent Application Serial No. PCT/CN2018/073923, filed Jan. 24, 2018, which claims priority to Chinese patent application No. 201710056860.0 titled "ELECTRONIC EXPANSION VALVE", filed with the China National Intellectual Property Administration on Jan. 26, 2017, Chinese patent application No. 201710056894.X titled "ELECTRONIC EXPANSION VALVE", filed with the China National Intellectual Property Administration on Jan. 26, 2017, and Chinese patent application No. 201710056865.3 titled "ELECTRONIC EXPANSION VALVE", filed with the China National Intellectual Property Administration on Jan. 26, 2017. The entire contents of these applications are incorporated herein by reference in their entireties.

FIELD

The present application relates to the technical field of fluid control components, and in particular to an electronic expansion valve.

BACKGROUND

In the field of cooling and heating technology, an electronic expansion valve is a refrigerant flow control component of a cooling and heating device. Its working process is generally: when a coil device as a stator is energized or de-energized, a magnetic rotor as a rotor is driven to rotate, and a screw fixedly connected to the magnetic rotor rotates with the rotation of the magnetic rotor and drives the valve needle to rotate. The electronic expansion valve is provided with a nut member, and the nut member is provided with an internal thread structure, and correspondingly, the screw is provided with an external thread structure. Through the engagement of the thread pair, the screw drives the valve needle to move up and down while rotating. The flow rate of the refrigerant flowing through the valve port is regulated by regulating the opening degree between the valve needle and the valve port, thereby realizing the function of the system and achieving the purpose of precise control.

When the electronic expansion valve is used in the cooling system, the vibration of the compressor and the pressure of the refrigerant pulse will cause a certain impact on the valve needle or the screw. If the coaxiality between the components is affected, the valve needle will be deflected, thereby causing wear of the thread pair and the valve port portion, and the above wear are accompanied by noise.

Therefore, a technical problem to be solved by those skilled in the art is to design an electronic expansion valve structure, which may effectively guide the valve needle while reduce the abnormal wear of the components due to deflection.

SUMMARY

To solve the technical problem, an electronic expansion valve is provided according to the present application to achieve good guiding to the valve needle assembly. In view of this, the following technical solutions are provided according to the present application.

An electronic expansion valve is provided, which includes:

a valve seat, wherein the valve seat has a valve chamber and is provided with a valve port;

a valve needle, which cooperates with the valve port to regulate a flow rate of the electronic expansion valve;

a screw, wherein the screw and the valve needle are floatably connected by a sleeve portion; and a nut, wherein the nut is engaged with the screw by a thread and a nut guiding portion is provided at a lower portion of the nut;

wherein the valve seat is fixedly connected to a guiding member, and the sleeve portion and the valve needle are simultaneously guided by the guiding member.

The electronic expansion valve according to the present application is provided with a guiding member to allow to simultaneously guide the valve needle and the sleeve portion, which can effectively prevent abnormal wear caused by the radial deflection of the valve needle and the sleeve portion, thereby improving the operational reliability of the product.

As a further supplement to the above complete technical solution, the corresponding technical features of the technical solution may also be transformed or refined as follows:

the guiding member may be formed integrally by cutting, the integral forming of the guiding member may further ensure the coaxiality between the guiding member and the valve port.

The valve seat is provided with a valve seat inner hole, and the guiding member is provided with a first outer edge portion, which is engagedly fixed to the valve seat inner hole.

The guiding member is provided with a second outer edge portion, which is engagedly fixed to the nut guiding portion.

An outer diameter of the first outer edge portion is larger than that of the second outer edge portion. Such arrangement may make the size of the nut not too large, thereby making it possible to miniaturize the product.

The guiding member is provided with a sleeve guiding portion, an inner diameter of the sleeve guiding portion is fitted with an outer diameter of the sleeve portion for guiding the sleeve portion.

The guiding member is further provided with a valve needle guiding portion, an inner diameter of the valve needle guiding portion is fitted with an outer diameter of the valve needle for guiding the valve needle.

A lower end of the guiding member is partially located within the valve chamber, which may prevent a strong impact on the valve needle when the high-pressure refrigerant enters from the first connecting pipe, thereby further preventing the valve needle from swinging and reducing wear and noise.

A top of the sleeve portion is provided with an end plate portion, and a lower end of the screw is fixedly connected to a boss.

The boss is provided with a boss thrust surface, the end plate portion is provided with an end plate thrust surface, and the boss thrust surface is provided opposite to the end plate thrust surface.

The following technical solutions are further provided according to the present application.

An electronic expansion valve is provided, which includes:

a valve seat, wherein the valve seat is provided with a valve port;

a valve needle, which may approach or move away from the valve port so as to regulate a flow rate of the electronic expansion valve;

a screw, wherein the screw and the valve needle are floatably connected by a sleeve portion; and a first spacer is provided between the valve needle and the sleeve portion.

The structure of the electronic expansion valve having such a structure may greatly reduce the resistance between the valve needle and the sleeve portion even if there were a friction between the spring and the side wall of the sleeve.

The sleeve portion has a sleeve lower end plate portion, the valve needle has a flange, which has a valve needle lower flange portion, and the first spacer is provided between the sleeve lower end plate portion and the valve needle lower flange portion The first spacer is made of a PTFE (polytetrafluoroethylene)-filled graphite.

The top of the sleeve portion is provided with the end plate portion, and the lower end of the screw is fixedly connected to the boss.

A spring and a point contact or a line contact are provided between the boss and the valve needle.

An inner side of the sleeve portion is further provided with a supporting member, which has a supporting boss, and the spring abuts against the supporting boss.

A bottom of the supporting boss is provided with a spherical portion.

A second spacer is provided between the spherical portion and the valve needle. When the screw and the valve needle are required to rotate relative to each other, at this time, the screw, the sleeve portion, the spring and the supporting member may be rotated relative to the valve needle as a whole, which may greatly improve the rotating flexibility of the valve needle and the screw.

As an alternative, a top of the valve needle is provided with a recess, which is provided with a sphere and the sphere abuts against the bottom of the supporting boss.

As another alternative, the top of the valve needle is provided with a recess, which is provided with a sphere and the sphere abuts directly against the spring.

The above alternatives may further simplify the structure by removing the second spacer or both removing the second spacer and the supporting member, thereby further reducing the resistive torque of rotation between the valve needle and the screw.

The following technical solutions are further provided according to the present application.

An electronic expansion valve is provided, which includes:

a valve seat, wherein the valve seat is provided with a valve port;

a valve needle, which may approach or move away from the valve port to regulate a flow rate of the electronic expansion valve;

the valve needle includes a main body portion, a first tapered section, a second tapered section, a third tapered section and a fourth tapered section, and the first tapered section is arranged adjacent to the main body portion, the tapered sections are provided in a listed sequence and the tapered angles of each tapered section that is successively provided are different.

According to the electronic expansion valve provided by the technical solution, the valve needle is arranged to include at least four tapered sections, and the four tapered sections are respectively provided with different angles, which not only ensures the flow regulation precision of the electronic expansion valve, but also reduces the noise of the electronic expansion valve.

As a further refinement or supplement, the technical solution may also be as follows.

The tapered angles of the second tapered section, the third tapered section and the fourth tapered section satisfy a following relationship:

$$\theta3>\theta2, \theta3>\theta4, \theta4>\theta2;$$

wherein $\theta2$ is the tapered angle of the second tapered section, $\theta3$ is the tapered angle of the third tapered section, and $\theta4$ is the tapered angle of the fourth tapered section.

The third tapered section has a tapered angle $\theta3$ in a range of $35°\pm10°$.

The tapered angle $\theta4$ of the fourth tapered section and the tapered angle of the third tapered section satisfy a following relationship:

$$\theta3 - \theta4 \approx 10°.$$

The first tapered section has a tapered angle $\theta1$ in a range of $50\pm15°$.

The tapered angle $\theta2$ of the second tapered section satisfies the relationship: $3°\leq\theta2\leq10°$.

The connection way of the valve needle and the screw is further defined.

The electronic expansion valve further includes a screw, wherein the screw and the valve needle are floatably connected by a sleeve portion.

The top of the sleeve portion is provided with an end plate portion, and a lower end of the screw is fixedly connected with a boss.

The boss is provided with a boss thrust surface, the end plate portion is provided with an end plate thrust surface, and the boss thrust surface is provided opposite the end plate thrust surface.

BRIEF DESCRIPTION OF THE DRAWINGS

For clearer illustration of the technical solutions according to embodiments of the present disclosure or conventional techniques, hereinafter are briefly described the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

DETAILED DESCRIPTION

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the protection scope of the present application.

First Embodiment

Figure 1:
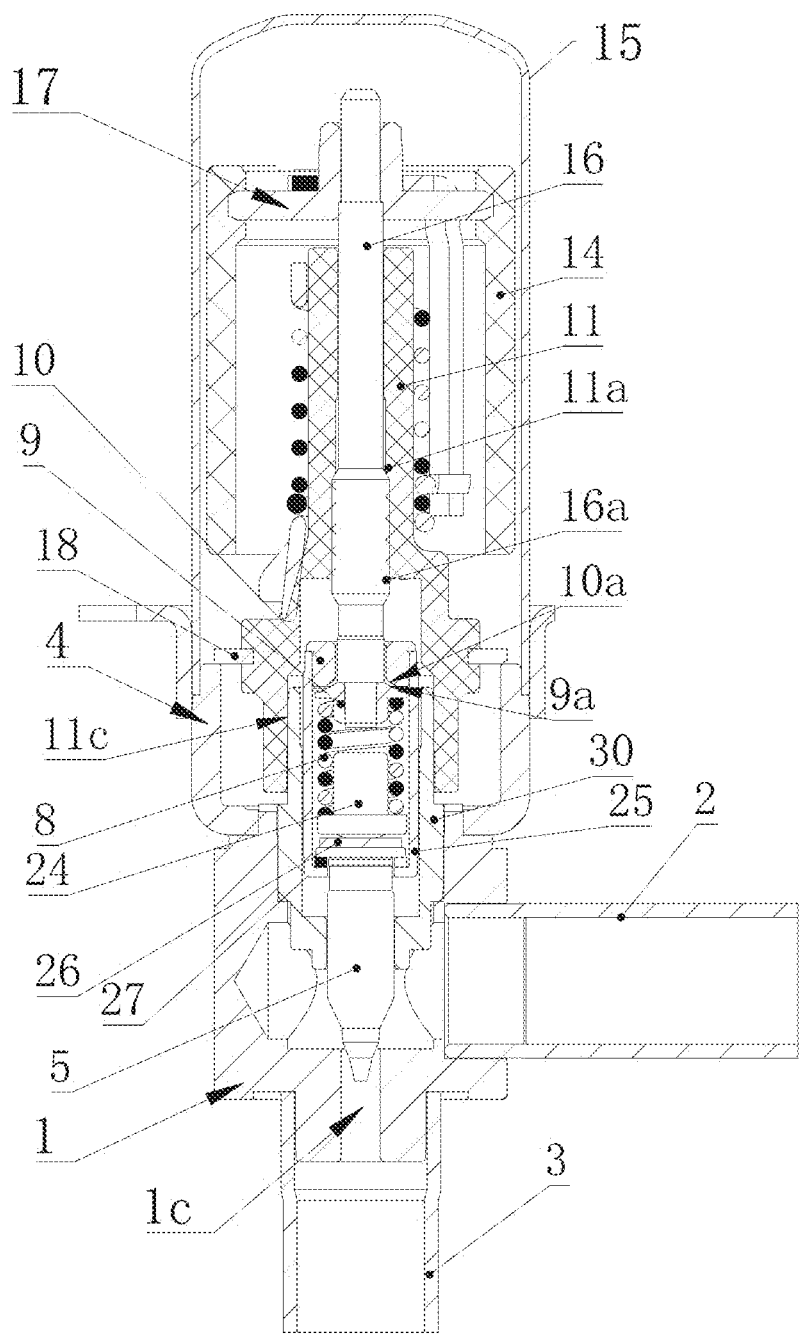
FIG. 1 is a schematic view showing the structure of an electronic expansion valve according to a first embodiment of the present application.
Figure 2:
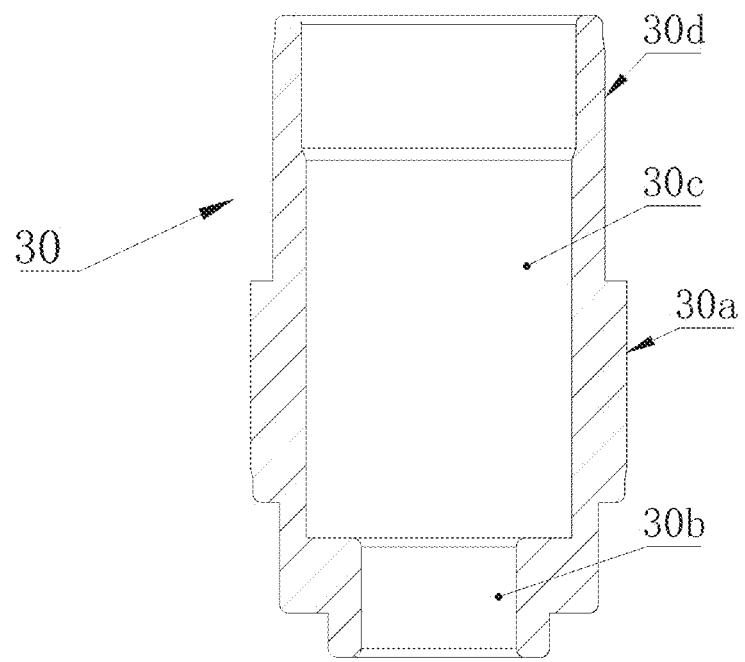
FIG. 2 is a schematic view showing the structure of a guiding member of an electronic expansion valve according to the first embodiment of the present application.
Figure 3:
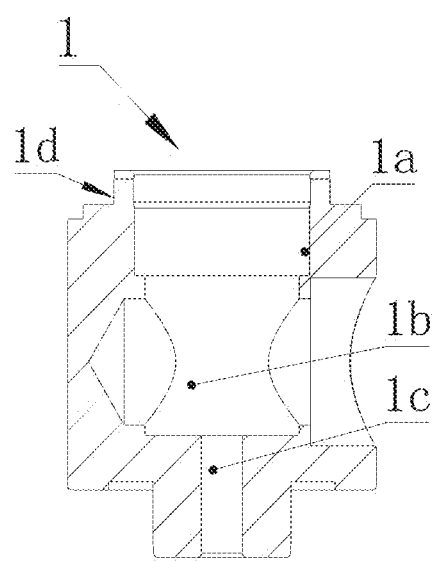
FIG. 3 is a schematic view showing the structure of a valve seat of an electronic expansion valve according to the first embodiment of the present application.

Referring to FIG. 1, FIG. 1 is a schematic view showing the structure of an electronic expansion valve according to the first embodiment of the present application.

It should be noted that the present application is directed to improve the fitting structure of a valve needle and a valve port of an electronic expansion valve in the conventional technology, and for other components, such as a magnetic rotor, a screw, a nut and a stopper, of the electronic expansion valve in the current technology may be used, or other electronic expansion valve structures that may achieve the same function may be used. The structure of the above components are not specifically limited in the present application, and those skilled in the art may apply it to all similar electronic expansion valve structures according to the technical solution disclosed in the present application.

The electronic expansion valve includes a valve seat 1, which may be formed by metal cutting, a first connecting pipe 2 is connected thereof in a circumferential direction, and a second connecting pipe 3 is connected to an lower end thereof in an axial direction, and a valve chamber 1b is formed inside the valve seat 1 to allow the refrigerant to circulate. The valve seat 1 is further provided with a valve port 1c, which cooperates with the valve needle 5 to change the flow area between the valve port 1c and the valve needle 5, thereby precisely regulating the flow rate.

A cover 4 is provided above the valve seat 1. The cover 4 is generally of a cup shape, and has an opening at the bottom thereof and is fixedly connected to the valve seat 1. Specifically, a step portion 1d may be provided at an upper end of the valve seat 1, and an opening provided at a bottom of the cover 4 may be engaged with the step portion 1d, which is welded and fixed.

A housing 15 is further provided above the cover 4, and the housing 15 and the cover 4 may be fixed by welding, so that a relatively closed space is formed among the housing 15, the cover 4 and the valve seat 1. The flow of the refrigerant and the flow rate are regulated by the first connecting pipe 2 and the second connecting pipe 3.

A magnetic rotor 14 is provided in a space enclosed by the housing 15 and the cover 4. As a rotor of the stepping motor, the magnetic rotor 14 may sense a signal from a coil member of the stator to rotate. A screw 16 is fixedly connected to the magnetic rotor 14 as a whole through the connecting plate 17, and specifically, the screw 16 and the connecting plate 17 may be fixed by welding, and the magnetic rotor 14 may be directly injection molded on the connecting plate 17.

The screw 16 and the valve needle 5 are floatably connected by a sleeve portion 25. The sleeve portion 25 is generally of a cup shape and has an opening at the bottom thereof. The valve needle 5 passes through the opening and enters the valve chamber to contact with or separate from the valve port. That is, during working of the electronic expansion valve, the valve needle 5 may move up and down with respect to the sleeve portion 25 in a certain distance, but cannot be separated from the restriction of the sleeve portion 25. A top of the sleeve portion 25 is provided with an end plate portion 10, the end plate portion 10 is provided with an end plate thrust surface 10a, a lower end of the screw 16 is fixedly connected to a boss 9, and the boss 9 is provided with a boss thrust surface 9a. During the assembly, the boss 9 and the screw 16 may be fixedly connected and then placed in an inner space of the sleeve portion 25, and the end plate portion 10 and the sleeve portion 25 may be fixed by, for example, welding. Thus, the boss thrust surface 9a is opposed to the end plate thrust face 10a, and at the same time, the sleeve portion 25 is suspended from the screw 16. The sleeve portion 25 and the screw 16 are not disengageable, but may be moved relative to each other. Disengagement as used herein is referred that the sleeve portion 25 and the screw 16 are separated into two separate members without any limitation to each other, but not the sleeve portion 25 and the screw 16 are not in physical contact.

A spring 8 is further provided on the back of the boss thrust surface 9a, that is, below the boss 9 shown in FIG. 1, and is supported by a supporting member 24. A second spacer 26 is further provided below the supporting member 24 and abuts against the valve needle 5. A first spacer 27 is further provided between the valve needle 5 and the sleeve portion 25, so that the valve needle 5 is suspended from the sleeve portion 25.

A nut 11 is fixed in a space surrounded by the housing 15 and the cover 4 by a metal connecting sheet 18. Specifically, the nut 11 may be made by a non-metallic material and be integrally injection-molded with the connecting sheet 18, and the connecting sheet 18 and the cover 4 may be fixedly connected by welding.

The nut 11 includes a through hole penetrating in the axial direction thereof, and an internal thread 11a is provided inside the through hole. Correspondingly, an outer peripheral surface of the screw 16 is provided with a section of an external thread portion 16a. Thus, when the magnetic rotor 14 performs a rotary motion, under the action of the thread pair, the screw 16 that is linked with the magnetic rotor 14 not only rotates and also moves up and down with respect to the nut, thereby driving the valve needle 5 to move up and down, so that the valve needle 5 approaches or moves away from the valve port 1c to achieve the purpose of regulating the flow rate of the refrigerant passing through the valve port 1c.

The bottom of the nut 11 is further provided with a nut guiding portion 11c for guiding with an outer edge portion of the guiding member 30 which is described later.

In the present embodiment, the valve seat 1 is further provided with a valve seat inner hole 1a at the upper end thereof, which is communicated with the valve chamber 1b. The valve seat inner hole 1a may be formed by cutting. The guiding member 30 is provided to engage with the valve seat inner hole 1a and is generally of a cylinder shape. In a specific embodiment, an outer peripheral surface of the guiding member 30 has a first outer edge portion 30a and a second outer edge portion 30d. An outer diameter of the first outer edge portion 30a is larger than that of the second outer edge portion 30d, and the first outer edge portion 30a is configured to engage and fix to the inner hole 1a of the valve seat, and specifically, an interference fit or a welding method may be employed. The outer diameter of the second outer edge portion 30d is fitted with the inner diameter of the nut guiding portion 11c, so that good assembly coaxiality may be ensured by the manner in which the two are sleevedly coupled together.

Of course, those skilled in the art may understand that the outer diameter of the first outer edge portion 30a shown in this embodiment is larger than the outer diameter of the second outer edge portion 30d, which is determined based on the inner diameter of the valve seat inner hole 1a being larger than the nut guiding hole 11c. As an equivalent alternative, the inner diameter of the valve seat inner hole 1a may be set smaller than the inner diameter of the nut guide hole 11c, but such an arrangement may cause the size of the nut to become larger if the size of the valve seat remains unchanged.

In a specific embodiment, an inner side of the guiding member 30 is provided with a sleeve guiding portion 30c and a valve needle guiding portion 30b, which has an inner diameter smaller than that of the sleeve guiding portion 30c. The inner diameter of the valve needle guiding portion 30b is fitted with the outer diameter of the valve needle 5, so that the outer peripheral surface of the valve needle 5 may be freely moved along the valve needle guiding portion 30b, and the valve needle 5 is provided with good guidance and radial support by the valve needle guide 30b for preventing abnormal wear of the valve port 1c due to the swing of the valve needle 5.

The inner diameter of the sleeve guiding portion 30c is fitted with the outer diameter of the sleeve portion 25 such that the outer peripheral surface of the sleeve portion 25 is freely movable along the sleeve guiding portion 30c, and the sleeve portion 25 is provided with good guidance and radial support by the sleeve guiding portion 30c for preventing abnormal swing of the screw 16 due to the swing of the sleeve portion 25, thereby causing the magnetic rotor 14 to swing and causing abnormal wear of the thread portion and running noise.

In the present embodiment, the first outer edge portion 30a, the sleeve guiding portion 30c and the valve needle guiding portion 30b of the guiding member 30 may be formed at one step, and the valve seat inner hole 1a, the valve port 1c and the step portion 1d are formed at one step, thus the coaxiality among the sleeve guiding portion 30c, the valve needle guiding portion 30b and the valve port 1c may be ensured.

A part of the lower end of the guiding member 30 is located inside the valve chamber 1b, so that when the high-pressure refrigerant enters the valve from the first connecting pipe 2, it does not cause a strong impact on the valve needle 5, thereby further preventing the valve needle from swinging and reducing wear and noise.

The orientation terms such as upper, lower, left and right described herein are all described in the reference view shown in FIG. 1, and should not be construed as limiting the present application.

Second Embodiment

Figure 4:
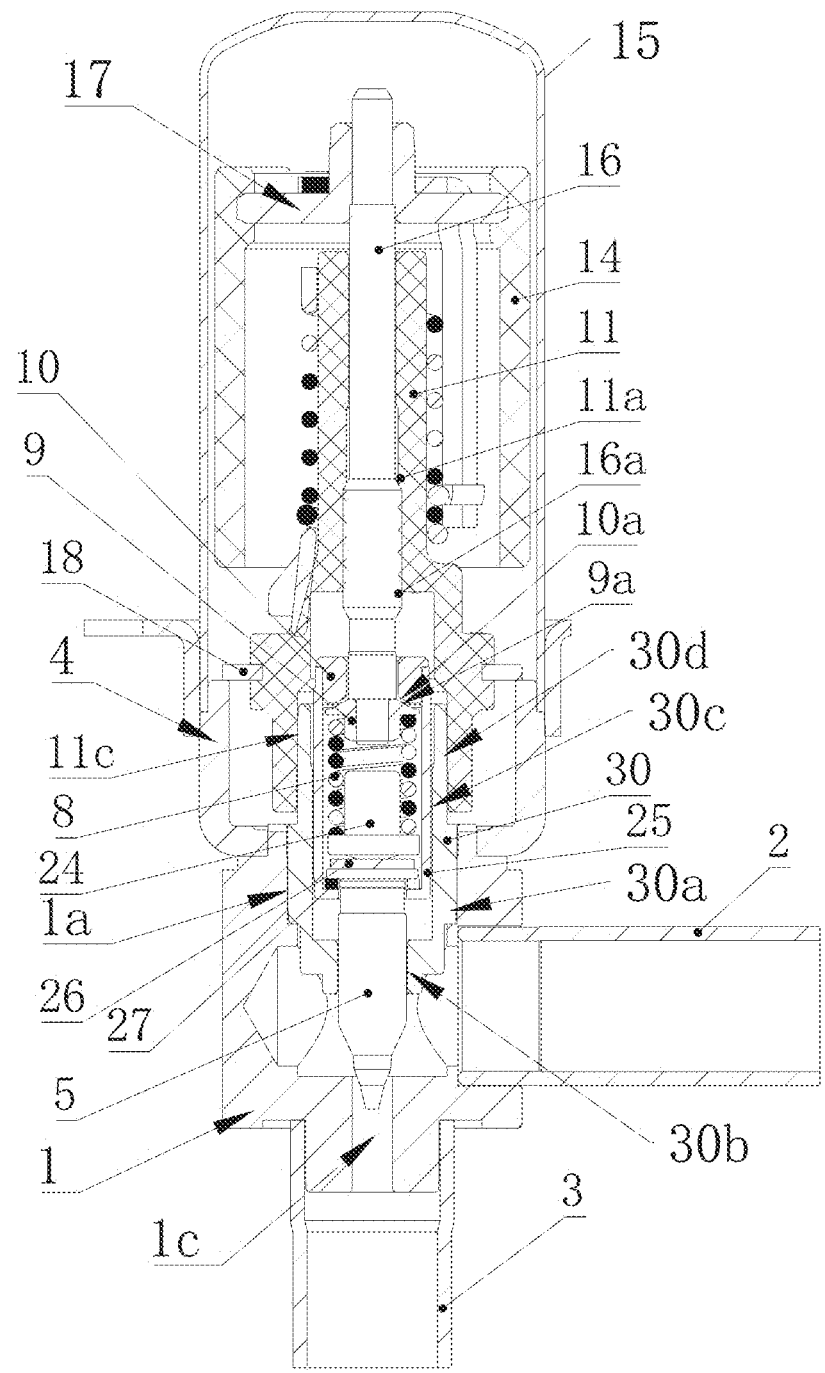
FIG. 4 is a schematic view showing the structure of an electronic expansion valve according to a second embodiment of the present application.

Referring to FIG. 4, FIG. 4 is a schematic view showing the structure of an electronic expansion valve according to the second embodiment of the present application.

It should be noted that the purpose of the present application is directed to improve the fitting structure of a valve needle and a valve port of an electronic expansion valve in the prior technology, the main member and the connection are the same as those in the first embodiment, and the same members and structures are denoted by the same reference numerals in the drawings. For the convenience of description, the same portions as those of the electronic expansion valve of the first embodiment will not be repeatedly described, and description will be made only for different points. Specific embodiments of the four valve needle assemblies are described in detail below.

Figure 5:
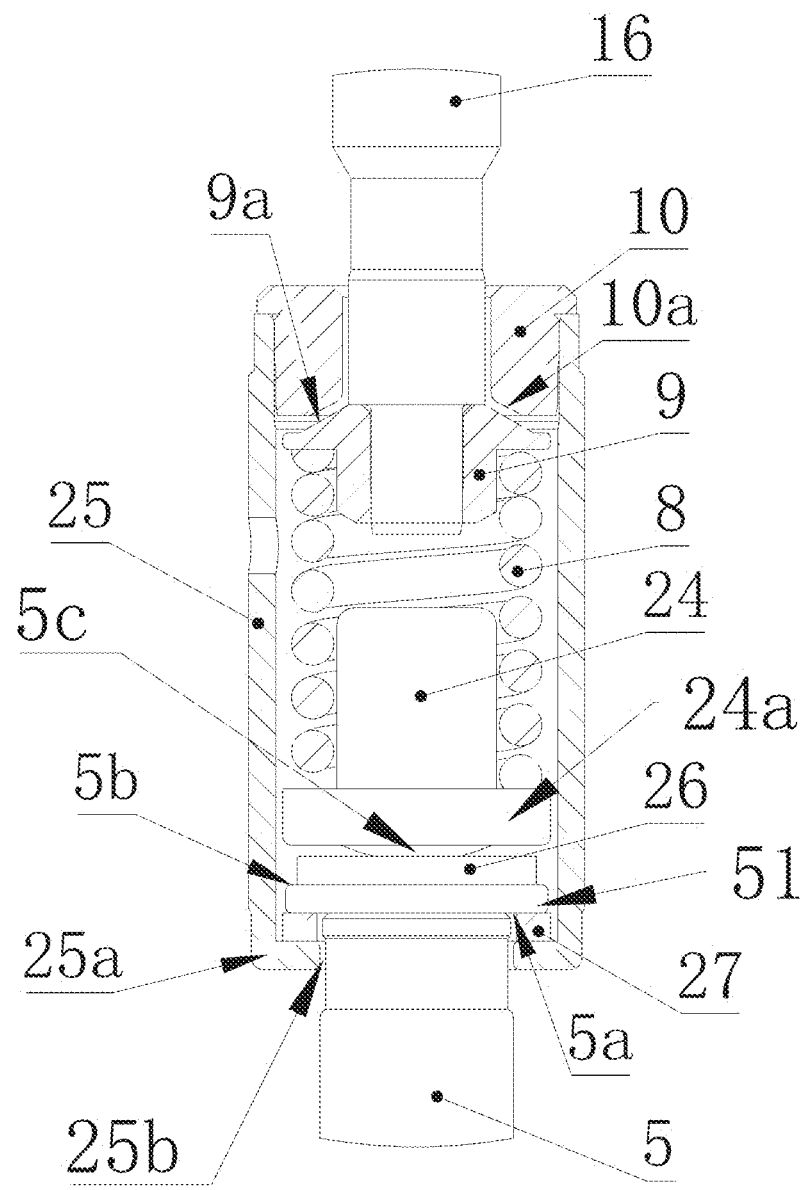
FIG. 5 is a schematic view showing the structure of a first type of valve needle assembly according to the second embodiment of the present application.

Referring to FIG. 5, FIG. 5 is a schematic view showing the structure of a first type of valve needle assembly according to the second embodiment of the present application.

The screw 16 and the valve needle 5 are floatably connected by the sleeve portion 25. The sleeve portion 25 is generally in a cup shape and has an opening at the bottom thereof. The valve needle 5 passes through the opening and enters the valve chamber to contact with or separate from the valve port. That is, during operation of the electronic expansion valve, the valve needle 5 may move up and down with respect to the sleeve portion 25 within a certain distance, but cannot be separated from the restriction of the sleeve portion 25. A top of the sleeve portion 25 is provided with the end plate portion 10, the end plate portion 10 is provided with the end plate thrust surface 10a, the lower end of the screw 16 is fixedly connected to the boss 9, and the boss 9 is provided with the boss thrust surface 9a. During the assembly, the boss 9 and the screw 16 may be fixedly connected and placed in the inner space of the sleeve portion 25, and the end plate portion 10 and the sleeve portion 25 may be fixed by, for example, welding. Thus, the boss thrust surface 9a is opposed to the end plate thrust face 10a, and at the same time, the sleeve portion 25 is suspended from the screw 16. The sleeve portion 25 and the screw 16 are not disengageable, but may be moved relative to each other. Disengagement as used herein is referred that the sleeve portion 25 and the screw 16 are separated into two separate members without any limitation to each other, and not only the two are not in physical contact.

The bottom of the sleeve portion 25 is formed with a sleeve lower end plate portion 25a having an opening portion 25b, and the top of the valve needle 5 has a flange 51 having an outer diameter larger than the inner diameter of the opening portion 25b, thus, when the valve needle is fitted into the sleeve portion 25, the valve needle does not come out of the sleeve portion 25 from the opening portion 25b. The flange 51 has a valve needle upper flange portion 5b and a valve needle lower flange portion 5a. After the assembly, a first spacer 27 is provided between the valve needle lower flange portion 5a and the sleeve lower end plate portion 25a. Specifically, the first spacer 27 may be made of a PTFE-filled graphite or may be a metal sheet such as brass coated by a wear reduction coating such as PTFE, thereby ensuring the lubricity and wear resistance of the first spacer 27.

A spring 8 and a supporting member 24 are further provided on the back of the boss thrust surface 9a, that is, below the boss 9 shown in FIG. 4. Specifically, the spring 8 is provided between the supporting member 24 and the boss 9. The supporting member 24 has a supporting boss 24a for supporting the spring 8. In a specific embodiment, the bottom of the supporting boss 24a is provided with a spherical portion 5c. In such arrangement, a point contact or a line contact are formed between the support boss 24a and a second spacer 26 described below, which may further effectively reduce the friction coefficient. Thus, a structure of a point contact or a line contact is formed between the boss 9 and the valve needle 5.

In the present embodiment, a second spacer 26 having an annular shape is provided between the supporting member 24 and the valve needle 5, so that the second spacer 26 abuts against the valve needle 5. The second spacer 26 may be made of PTFE-filled graphite to ensure lubricity and wear resistance. The second spacer 26 may be made of stainless steel, when stainless steel is employed, a small boss may be placed at the upper end of the valve needle to reduce the contact area between the second spacer and the valve needle.

A nut 11 is fixed in a space surrounded by the housing 15 and the cover 4 by a metal connecting sheet 18. Specifically, the nut 11 may be integrally injection-molded with the connecting sheet 18 by a non-metallic material and the connecting sheet 18 and the cover 4 may be fixedly connected by welding.

The nut 11 has a through hole penetrating in the axial direction thereof, and an internal thread 11a is provided inside the through hole. Correspondingly, an outer peripheral surface of the screw 16 is provided with a section of an external thread portion 16a. Thus, when the magnetic rotor 14 performs a rotary motion, under the action of the thread pair, the screw 16 that is linked with the magnetic rotor 14 not only rotates and also moves up and down with respect to the nut, thereby driving the valve needle 5 to move up and down, so that the valve needle 5 approaches or moves away from the valve port 1c to achieve the purpose of regulating the flow rate of the refrigerant passing through the valve port 1c.

The bottom of the nut 11 is further provided with a nut guiding portion 11c for guiding with the outer edge portion of the guiding member 30 which is described later.

In the present embodiment, the valve seat 1 is further provided with the valve seat inner hole 1a at the upper end thereof, and is communicated with the valve chamber 1b. The valve seat inner hole 1a may be formed by cutting. The guiding member 30 is provided to engage with the valve seat inner hole 1a and is generally of a cylinder shape. In a specific embodiment, the outer peripheral surface of the guiding member 30 has a first outer edge portion 30a and a second outer edge portion 30d. The outer diameter of the first outer edge portion 30a is larger than the outer diameter of the second outer edge portion 30d, and the first outer edge portion 30a is configured to engage and fix to the inner hole 1a of the valve seat, and specifically, an interference fit or a welding method may be employed. The outer diameter of the second outer edge portion 30d is fitted with the inner diameter of the nut guiding portion 11c, so that good assembly coaxiality may be ensured by the manner in which the two are sleeved together.

Of course, those skilled in the art may understand that the outer diameter of the first outer edge portion 30a shown in this embodiment is larger than the outer diameter of the second outer edge portion 30d, which is designed based on the inner diameter of the valve seat inner hole 1a being larger than the nut guiding hole 11c. As an equivalent alternative, the inner diameter of the valve seat inner hole 1a may be smaller than the inner diameter of the nut guide hole 11c, but such an arrangement may cause the size of the nut to become larger if the size of the valve seat remains unchanged.

In a specific embodiment, a sleeve guiding portion 30c and a valve needle guiding portion 30b having an inner diameter smaller than that of the sleeve guiding portion 30c is provided inside the guiding member 30. The inner diameter of the valve needle guiding portion 30b is fitted with the outer diameter of the valve needle 5, so that the outer peripheral surface of the valve needle 5 may be freely moved along the valve needle guiding portion 30b, and the valve needle 5 is provided with good guidance and radial support by the valve needle guide 30b to prevent abnormal wear of the valve port 1c due to the swing of the valve needle 5.

The inner diameter of the sleeve guiding portion 30c is fitted with the outer diameter of the sleeve portion 25 such that the outer peripheral surface of the sleeve portion 25 is freely movable along the sleeve guiding portion 30c, and the sleeve portion 25 is provided with good guidance and radial support by the sleeve guiding portion 30c for preventing abnormal swing of the screw 16 due to the swing of the sleeve portion 25, thereby causing the magnetic rotor 14 to swing and causing abnormal wear of the thread portion and running noise.

In the present embodiment, the first outer edge portion 30a, the sleeve guiding portion 30c and the valve needle guiding portion 30b of the guiding member 30 may be formed at one step, and the valve seat inner hole 1a, the valve port 1c and the step portion 1d are formed at one step, thus the coaxiality between the sleeve guiding portion 30c, the valve needle guiding portion 30b and the valve port 1c may be ensured.

A part of the lower end of the guiding member 30 is located inside the valve chamber 1b, so that when the high-pressure refrigerant enters the valve from the first connecting pipe 2, it does not cause a strong impact on the valve needle 5, thereby further preventing the valve needle from swinging and reducing wear and noise.

Figure 6:
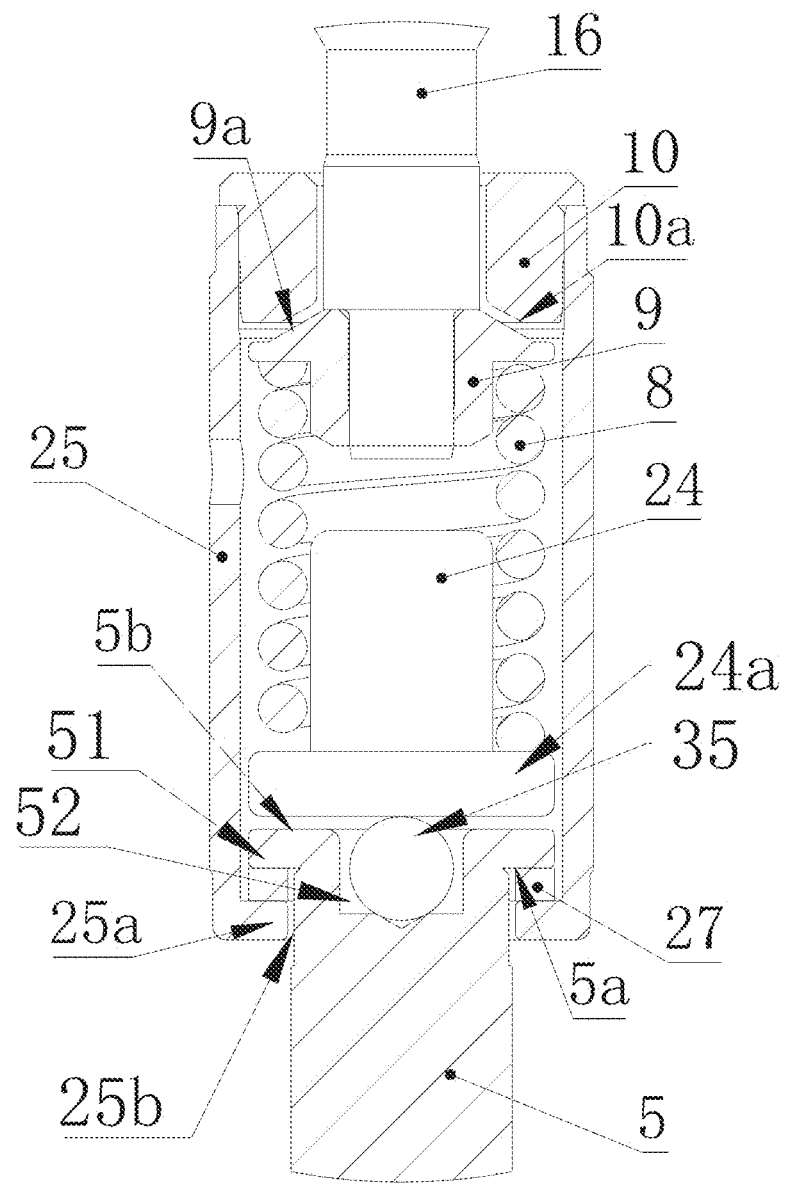
FIG. 6 is a schematic view showing the structure of a second type of valve needle assembly according to the second embodiment of the present application.

Referring to FIG. 6, FIG. 6 is a schematic view showing the structure of a second type of valve needle assembly according to the second embodiment of the present application.

For the convenience of description, the same portions as those of the first type of valve needle assembly in the present embodiment will not be described again, and description will be made only for different points.

In the present embodiment, the top of the valve needle 5 is provided with a recess 52, and a sphere 35 is placed on the recess 52. The diameter of the sphere 35 is larger than the depth of the recess 52, so that the top of the sphere 35 directly abuts against the supporting boss 24a of the supporting member 24, and the point contact or the line contact may also be achieved to reduce the friction coefficient between the two members.

The sphere 35 may specifically be a steel sphere made of a steel material, or other metal materials may be formed the sphere 35, which is not limited in this embodiment.

Figure 7:
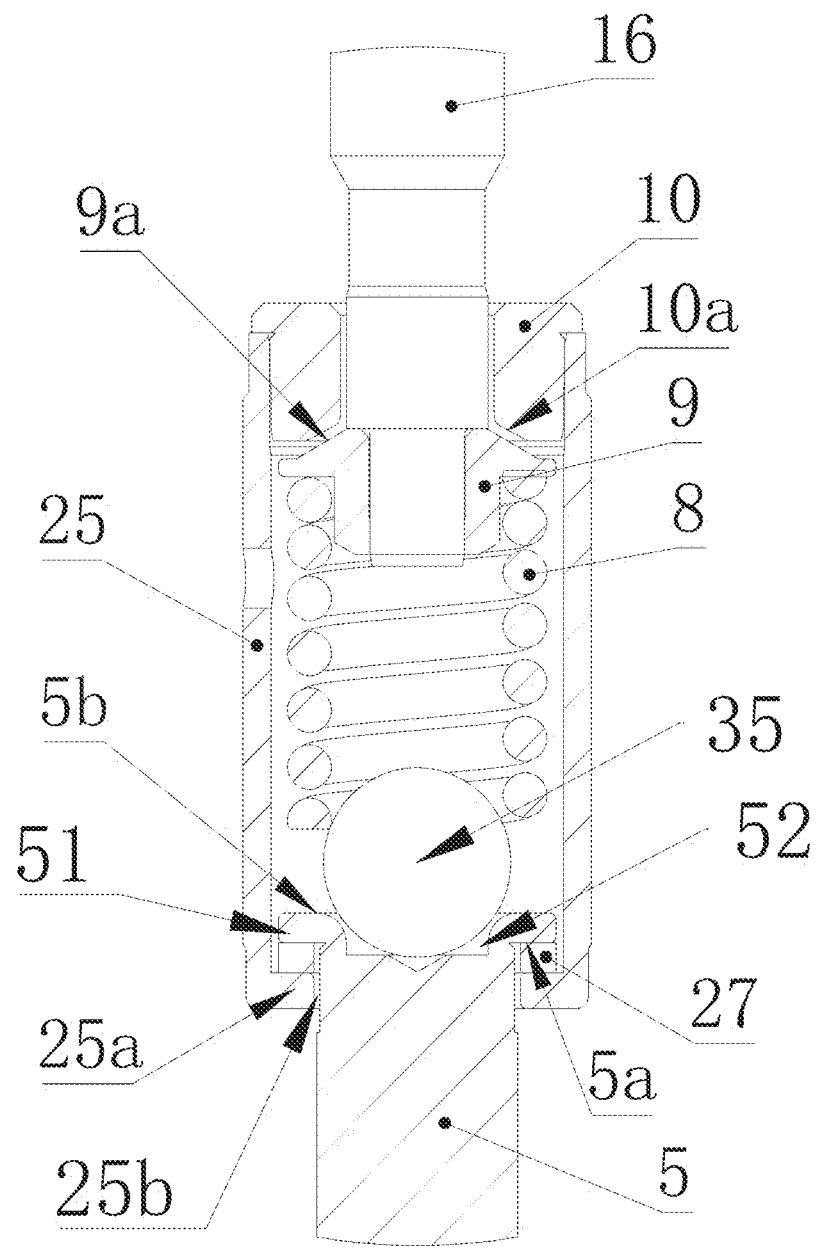
FIG. 7 is a schematic view showing the structure of a third valve needle assembly according to the second embodiment of the present application.

Referring to FIG. 7, FIG. 7 is a schematic view showing the structure of a third valve needle assembly according to the second embodiment of the present application.

In the present embodiment, the supporting member 24 is removed as compared with the second valve needle assembly, the recess 52 is provided directly on the top of the valve needle 5, and the sphere 35 is placed on the recess 52. The diameter of the sphere 35 is increased to fit with the inner diameter of the spring, that is, slightly larger than the inner diameter of the spring 8, so that the lower end of the spring 8 may be pressed against the sphere 35 without causing the entire sphere 35 to enter the spring 8. Thus, a point contact or a line contact is formed between the sphere 35 and the valve needle 5.

Figure 8:
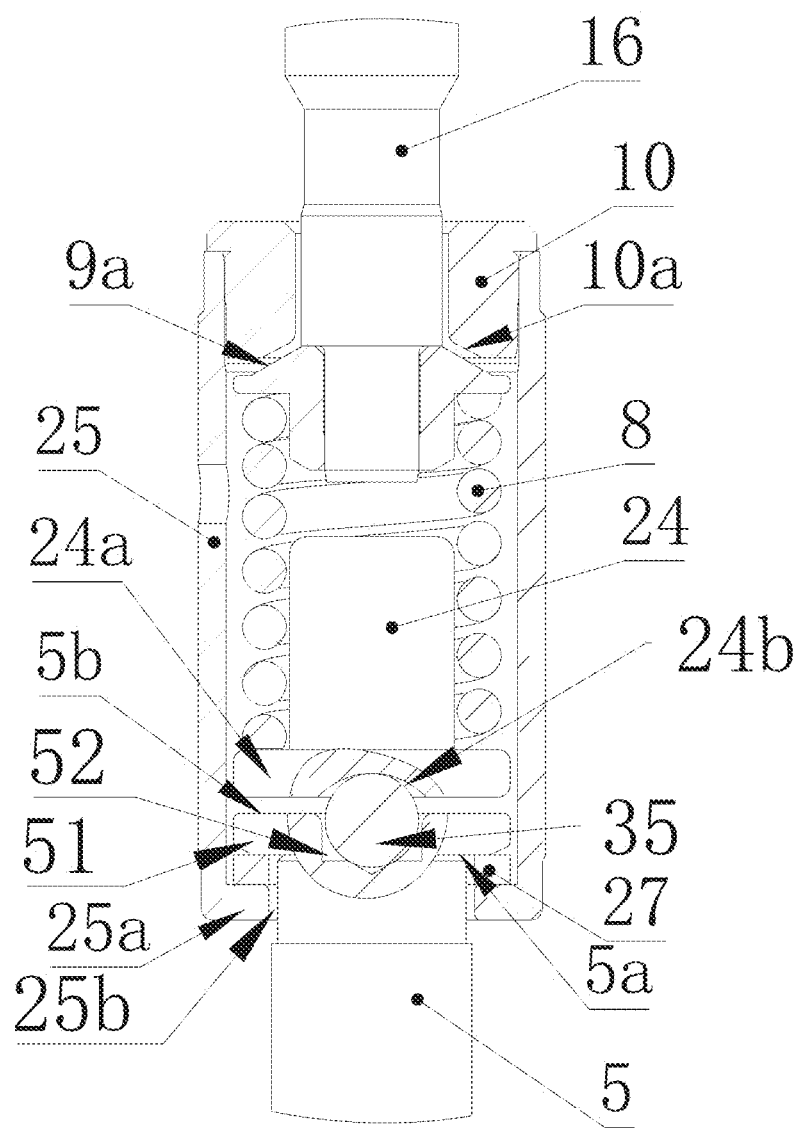
FIG. 8 is a schematic view showing the structure of a fourth valve needle assembly according to the second embodiment of the present application.

Referring to FIG. 8, FIG. 8 is a schematic view showing the structure of a fourth valve needle assembly according to the second embodiment of the present application.

The screw 16 and the valve needle 5 are floatably connected by a sleeve portion 25. The sleeve portion 25 is generally in a cup shape and has an opening at the bottom. The valve needle 5 passes through the opening and enters the valve chamber to contact with or separate from the valve port. That is, during the operation of the electronic expansion valve, the valve needle 5 may move up and down with respect to the sleeve portion 25 within a certain stroke, but cannot be separated from the restriction of the sleeve portion 25. A top of the sleeve portion 25 is provided with an end plate portion 10, the end plate portion 10 is provided with an end plate thrust surface 10a, a lower end of the screw 16 is fixedly connected to a boss 9, the boss 9 is provided with a boss thrust surface 9a. During the assembly, the boss 9 and the screw 16 may be fixedly connected and placed in the inner space of the sleeve portion 25, and the end plate portion 10 and the sleeve portion 25 may be fixed by, for example, welding. Thus, the boss thrust surface 9a is opposed to the end plate thrust face 10a, and at the same time, the sleeve portion 25 is suspended from the screw 16. The sleeve portion 25 and the screw 16 are not disengageable, but may be moved relative to each other. Disengagement as used herein is referred that the sleeve portion 25 and the screw 16 are separated into two separate members without any limitation to each other, and not only the two are not in physical contact.

The bottom of the sleeve portion 25 is formed with a sleeve lower end plate portion 25a having an opening portion 25b, and the top of the valve needle 5 has the flange 51 having an outer diameter larger than the inner diameter of the opening portion 25b, thus, when the valve needle is assembled into the sleeve portion 25, the valve needle does not come out of the sleeve portion 25 from the opening portion 25b. The flange 51 has a valve needle upper flange portion 5b and a valve needle lower flange portion 5a. After the assembly, the first spacer 27 is provided between the valve needle lower flange portion 5a and the sleeve lower end plate portion 25a. Specifically, the first spacer 27 may be made of a PTFE-filled graphite or may be a metal sheet such as brass coated by a wear reduction coating such as PTFE, thereby ensuring the lubricity and wear resistance of the first spacer 27.

The spring 8 and the supporting member 24 are further provided on the back of the boss thrust surface 9a, that is, below the boss 9 shown in FIG. 4. Specifically, the spring 8 is provided between the supporting member 24 and the boss 9. The supporting member 24 has a supporting boss 24a for supporting the spring 8. In the present embodiment, the bottom of the supporting boss 24a is provided with a recessed portion 24b, and correspondingly, the top of the valve needle 5 is provided with the recess 52, such that a space is formed between the recessed portion 24b of the supporting member and the recess 52 of the valve needle, and the sphere 35 is placed on the recess 52, at this time, the top of the sphere 35 abuts against the inner spherical wall of the recessed portion 24b.

Thus, the point contact or the line contact is formed between the sphere 35 and the valve needle 5.

During the operation of the electronic expansion valve, by giving the stepping motor stator a pulse command, the magnetic rotor 14 is driven to rotate, the screw is rotated, and the valve needle is driven to move up and down by the action of the thread pair, thereby obtaining a specific flow curve. Since the screw itself is rotating, it is inevitable to naturally give the valve needle a torque. When the valve needle 5 is in contact with the valve port 1c, the valve port is in a closed state, and the flow rate approaches 0. When the critical valve opening point is approached, the flow rate increases as the pulse increases. Taking the critical valve opening point as a boundary line, at this time, the sealing surfaces of the valve needle 5 and the valve port 1c are just in contact with each other. In order to improve the reliability of the product, it is desirable that the valve needle 5 does not rotate at this time, and the relative rotation between the valve needle 5 and the screw 16 may be easily performed. That is, it is desirable that only the screw 16 rotates, and the valve needle 5 does not rotate. At this time, the boss thrust surface 9a and the end plate thrust surface 10a are also in contact with each other, and further, the spring force and the air pressure applied to the valve needle 5 act between the boss thrust surface 9a and the end plate thrust surface 10a, or between the sleeve lower end plate portion 25a and the valve needle lower flange portion 5a. In order to ensure flexible rotation of the valve needle and the screw, the friction coefficient between the above boss thrust surface 9a and the end plate thrust surface 10a or the friction coefficient between the sleeve lower end plate portion 25a and the valve needle lower flange portion 5a should be minimized.

Due to possible errors in manufacturing and assembly, a side surface of the spring 8 is easily rubbed against the inner wall of the sleeve portion 25 to increase the resistance, therefore, it is particularly important to reduce the friction coefficient between the sleeve lower end plate portion 25a and the valve needle lower flange portion 5a. According to the several embodiments provided by the present application, the first spacer 27 is provided between the sleeve lower end plate portion 25a and the valve needle lower flange portion 5a, even in the case that the spring 8 is rubbed against the side wall of the sleeve portion 25, the resistance between the valve needle 5 and the sleeve portion 25 may be greatly reduced.

The second spacer is provided between the upper end of the valve needle and the supporting member 24, and a point contact or a line contact is further provided, which may greatly reduce the resistance between the valve needle 5 and the supporting member 24. When the screw 16 and the valve needle 5 are required to rotate relative to each other, the screw 16, the sleeve portion 25, the spring 8 and the supporting member 24 may rotate relative to the valve needle 5 as a whole, which may greatly improve the flexibility of the rotation of the valve needle 5 and the screw 16.

Even after the valve needle 5 is away from the valve port 1c, in some cases, since the gap between the valve needle 5 and the valve port 1c is small, there is friction in the rotation between the valve needle and the valve port. Due to the presence of the spacer between the valve needle 5 and the sleeve portion 25, it may still ensure that there is no relative rotation between the valve needle and the valve port to avoid wear on the valve port.

In the above second and third valve needle assemblies, the structure may be further simplified, the second spacer may be removed or both the second spacer 26 and the supporting member 24 are removed, thereby further reducing the resistive torque of rotation between the valve needle 5 and the screw 16.

The orientation terms such as upper, lower, left and right described herein are all described in the reference view shown in FIG. 4, and should not be construed as limiting the present application.

Third Embodiment

Figure 9:
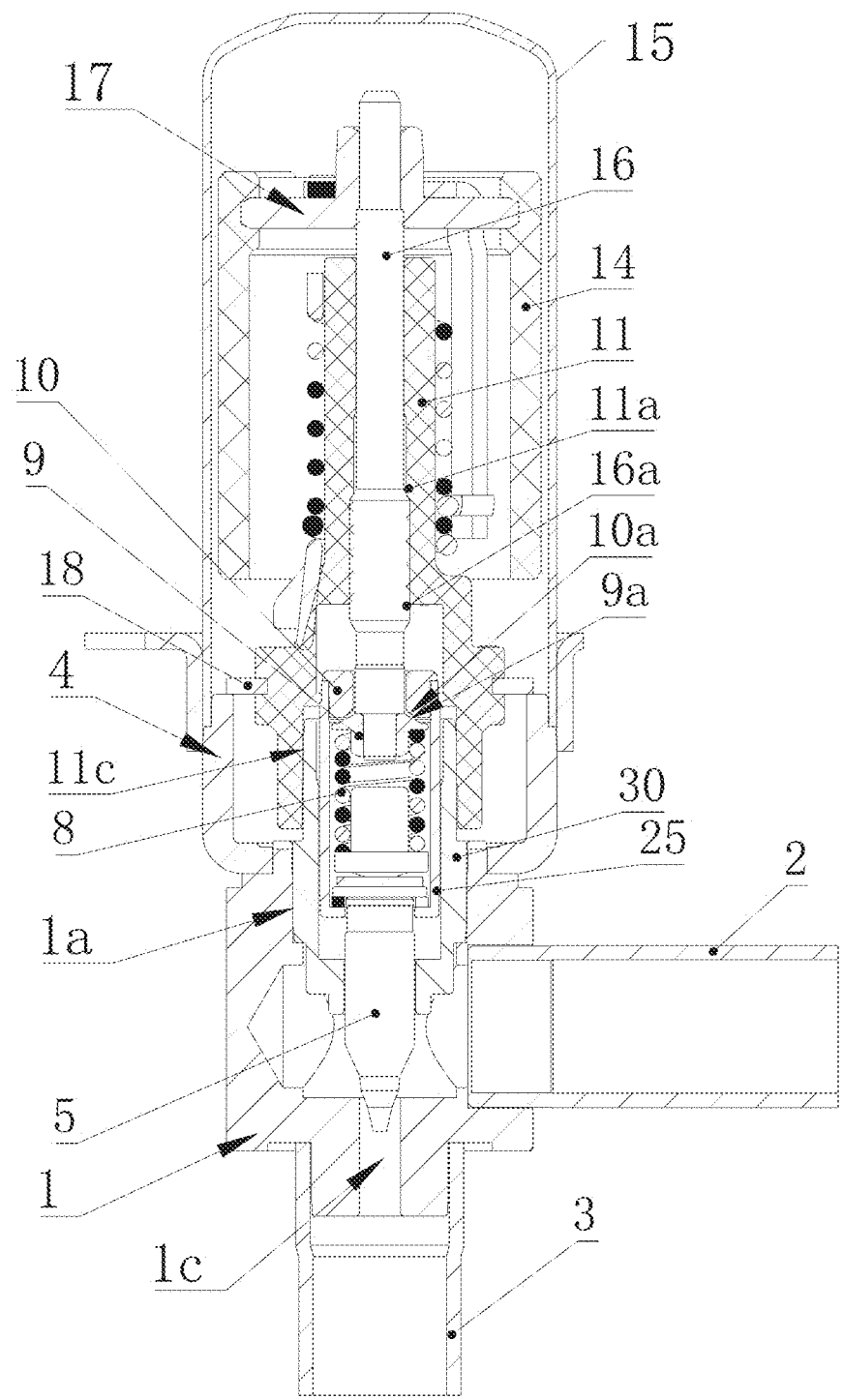
FIG. 9 is a schematic view showing the structure of an electronic expansion valve according to a third embodiment of the present application.

Referring to FIG. 9, FIG. 9 is a schematic view showing the structure of an electronic expansion valve according to the third embodiment of the present application.

It should be noted that the present application is directed to improve the fitting structure of a valve needle and a valve port of an electronic expansion valve in the prior technology, the main member and the connection are the same as those in the first embodiment, and the same members and structures are denoted by the same reference numerals in the drawings. For the convenience of description, the same portions as those of the electronic expansion valve of the first embodiment will not be repeatedly described.

Figure 10:
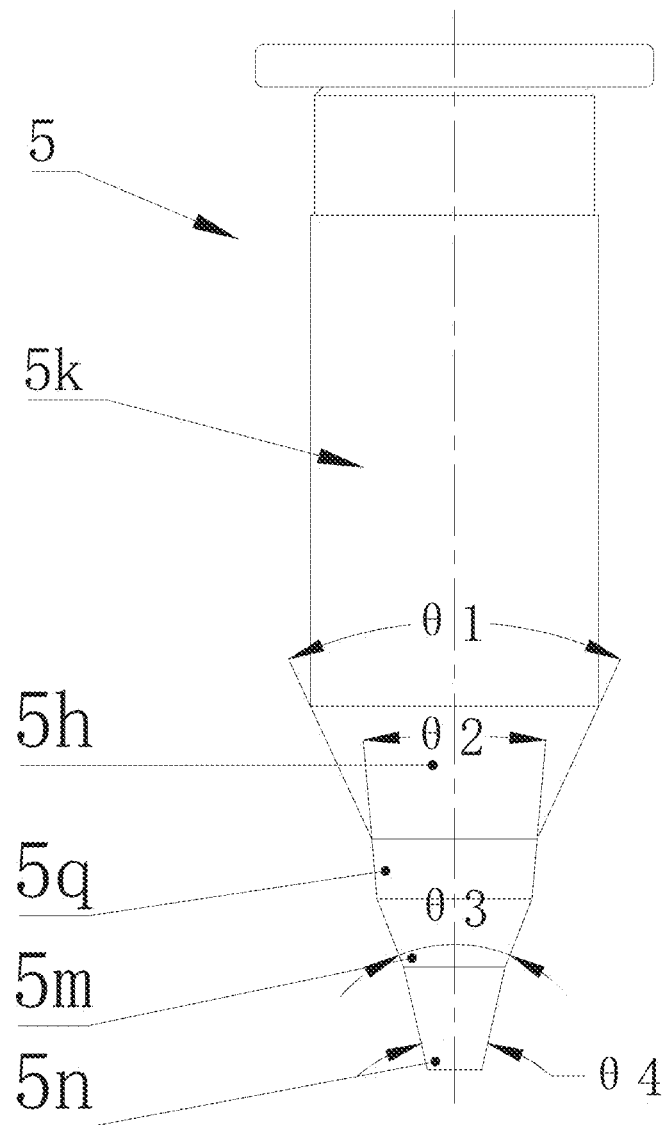
FIG. 10 is a schematic view showing the structure of a valve needle according to the third embodiment of the present application.

Referring to FIG. 10, FIG. 10 is a schematic view showing the structure of a valve needle according to the third embodiment of the present application.

The valve needle 5 includes a main body portion 5$k$ with a cylindrical structure, and a first tapered section 5$h$, a second tapered section 5$q$, a third tapered section 5$m$, and a fourth tapered section 5$n$ having different tapered angles from top to bottom. The tapered angle of the first tapered section 5$h$ (that is, the angle of the longitudinal section) is θ1, the tapered angle of the second tapered section 5$q$ is θ2, the tapered angle of the third tapered section 5$m$ is θ3, and the tapered angle of the fourth tapered section 5$n$ is θ4; that is, the tapered angles of each tapered section set in sequence are different. The angle θ2 is the smallest angle, and the angle of the third tapered section 5$m$ is larger than that of the second tapered section 5$q$ and that of the fourth tapered section 5$n$, that is, θ3>θ2, θ3>θ4, θ4>θ2.

The angle θ2 is in correspondence with a low pulse region. The smaller the angle of the low pulse region is, the higher the precision of the flow regulation is, the larger the pulse region with the minimum heating or minimum cooling capacity is, and the stronger the ability of the air conditioner to adapt to complex climate changes is. Because the flow rate of the refrigerant in the low opening region is small, the normal refrigerant flow sound is also small, a narrow trumpet-shaped region is formed by the second tapered section 5$q$ and the valve port, and the disturbance to the refrigerant is also small.

Under normal cooling or heating conditions, the requirement for the refrigerant flow is relatively large, and then the third tapered section 5$m$ is required to be used. Since the refrigerant flow rate is fast, the flow path is expected to expand rapidly after the valve port is throttled at the narrowest point. The larger the tapered angle is, the faster the flow path is expanded, so that the flow rate may be reduced, avoiding the local static pressure too low caused by the excessive flow rate to prevent the vaporization of the refrigerant due to the low static pressure.

Figure 12:
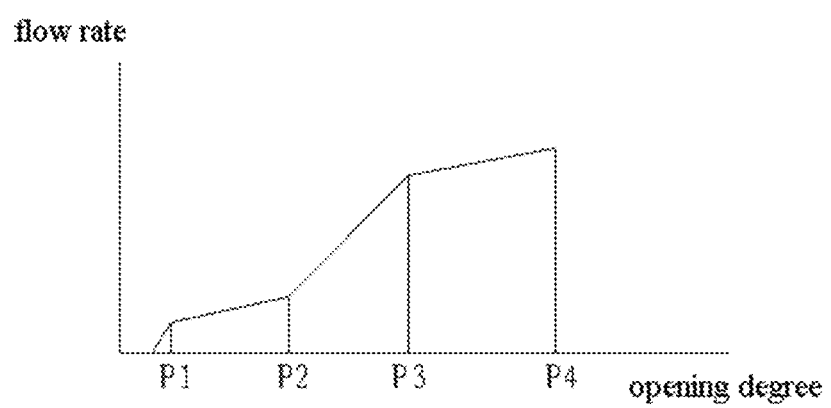
FIG. 12 is a flow curve showing a flow rate of an electronic expansion valve according to the third embodiment of the present application.

Referring to FIG. 12, FIG. 12 is a flow curve showing the flow rate of an electronic expansion valve according to the third embodiment of the present application.

Figure 11:
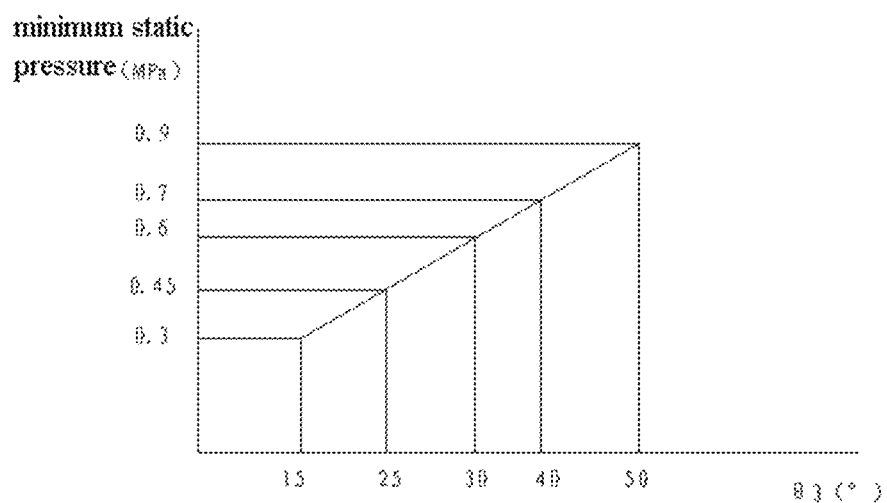
FIG. 11 is a view showing the relationship between the tapered angle and the minimum static pressure of a third tapered section of a valve needle of an electronic expansion valve according to the third embodiment of the present application.

The pulse corresponding to the second tapered section 5$q$ is 50 (P1) to 150 (P2), the pulse corresponding to the third tapered section 5$m$ is 150 (P2) to 350 (P3), and the pulse corresponding to the fourth tapered section 5$n$ is 350 (P3) to 500 (P4). Generally, the pulses normally used for normal cooling or heating are usually between 150 (P2) and 350 (P3), in which the frequency is high and noise is easy to produce. In the present embodiment, the tapered angle of the third tapered section 5$m$ is increased, which is very advantageous for increasing the minimum static pressure. The higher the minimum static pressure, the less easily the liquid refrigerant vaporizes. When the inlet pressure difference is 3.0 mpa and the outlet pressure difference is 1.2 mpa, the relationship between the different tapered angles θ3 and the minimum average static pressure of the third tapered section 5$m$ is as shown in FIG. 11.

The larger the third tapered angle θ3 is, the smaller the minimum average static pressure is. However, when the temperature exceeds 50°, the flow precision of the high pulse region is poor, which will cause the valve opening range to increase in the 350 to 500 pulse flow region, the flow rate will not increase significantly and the overall flow regulation precision will decrease. If the third tapered angle θ3 is too small, the effect of increasing the average minimum static pressure is poor. Therefore, the preferred angle θ3 is set to 35°±10°, and the corresponding number of pulses does not exceed 350 pulses. Generally, when the opening degree is increased to 350 pulses, since the opening degree of the valve is large at this time, the throttle effect of the valve port is weak, the flow rate is small, the angle θ4 is reduced, and the minimum static pressure is not significantly reduced. In order to improve the overall flow regulation precision of the electronic expansion valve, the angle θ4 is smaller than θ3, and the preferred angle θ4 is about 10° smaller than θ3.

From the view of the noise angle and the flow curve, the smaller the angle of θ1, the better. On one hand, the angle θ1 is small, so it may make the flow regulation precision before the first inflection point on the flow curve high, which is convenient for the electronic expansion valve to be used in the low pulse region. On the other hand, the angle θ1 is small, regardless of whether the fluid is flowing forward or backward, it will reduce the disturbance of the valve to the fluid and reduce noise. However, if the angle θ1 is too small, the valve needle and the valve port will be locked, and it is preferable that the angle θ1 is set to 50±15°.

From the view of the fluid regulation precision, the smaller the angle θ2, the better. In the present embodiment, the angle θ2 is set between 3° to 10°, and the length is set to a length corresponding to a pulse within 200 pulses, preferably a length corresponding to 150 pulses.

The orientation terms such as upper, lower, left and right described herein are all described in the reference view shown in FIG. 9, and should not be construed as limiting the present application.

Based on the above description of the disclosed embodiments, the person skilled in the art may carry out or use the present application. It is obvious for the person skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

The invention claimed is:

1. An electronic expansion valve, comprising:
a valve seat, wherein the valve seat has a valve chamber and is provided with a valve port;
a valve needle, which cooperates with the valve port to regulate a flow rate of the electronic expansion valve;
a screw, wherein the screw and the valve needle are floatably connected by a sleeve portion; and
a nut, wherein the nut is connected with the screw by a thread and a nut guiding portion is provided at a lower portion of the nut;
wherein the valve seat is fixedly connected to a guiding member, and the sleeve portion and the valve needle are simultaneously guided by the guiding member,
wherein the valve seat is provided with a valve seat inner hole, and the guiding member is provided with a first outer edge portion, which is engagedly fixed to the valve seat inner hole, and the guiding member is provided with a second outer edge portion, which is engagedly fixed to the nut guiding portion.

2. The electronic expansion valve according to claim 1, wherein the guiding member is formed integrally by cutting.

3. The electronic expansion valve according to claim 1, wherein an outer diameter of the first outer edge portion is larger than an outer diameter of the second outer edge portion.

4. The electronic expansion valve according to claim 1, wherein the guiding member is provided with a sleeve guiding portion, an inner diameter of the sleeve guiding portion is fitted with an outer diameter of the sleeve portion for guiding the sleeve portion.

5. The electronic expansion valve according to claim 1, wherein the guiding member is further provided with a valve needle guiding portion, an inner diameter of the valve needle guiding portion is fitted with an outer diameter of the valve needle for guiding the valve needle.

6. The electronic expansion valve according to claim 1, wherein a lower end of the guiding member is partially located in the valve chamber.

7. The electronic expansion valve according to claim 1, wherein a top of the sleeve portion is provided with an end plate portion, and a lower end of the screw is fixedly connected to a boss; the boss is provided with a boss thrust surface, the end plate portion is provided with an end plate thrust surface, and the boss thrust surface is provided opposite to the end plate thrust surface.

8. The electronic expansion valve according to claim 1, wherein a first spacer is provided between the valve needle and the sleeve portion.

9. The electronic expansion valve according to claim 8, wherein the sleeve portion has a sleeve lower end plate portion, the valve needle has a flange, which has a valve needle lower flange portion, and the first spacer is provided between the sleeve lower end plate portion and the valve needle lower flange portion.

10. The electronic expansion valve according to claim 9, wherein the first spacer is made of a PTFE-filled graphite or a metal sheet coated with PTFE.

11. The electronic expansion valve according to claim 1, wherein a top of the sleeve portion is provided with the end plate portion, and the lower end of the screw is fixedly connected to the boss; a spring and a point contact or a line contact are provided between the boss and the valve needle.

12. The electronic expansion valve according to claim 11, wherein an inner side of the sleeve portion is further provided with a supporting member, which has a supporting boss, and the spring abuts against the supporting boss.

13. The electronic expansion valve according to claim 12, wherein a bottom of the supporting boss is provided with a spherical portion.

14. The electronic expansion valve according to claim 13, wherein a second spacer is provided between the spherical portion and the valve needle.

15. The electronic expansion valve according to claim 12, wherein a top of the valve needle is provided with a recess, which is provided with a sphere and the sphere abuts against the bottom of the supporting boss.

16. The electronic expansion valve according to claim 12, wherein the bottom of the supporting boss is provided with a recessed portion, the top of the valve needle is provided with a recess, and a sphere is provided between the recess and the recessed portion.

17. The electronic expansion valve according to claim 11, wherein the top of the valve needle is provided with a recess, which is provided with a sphere and the sphere directly abuts against the spring.

18. The electronic expansion valve according to claim 1, wherein the valve needle comprises a main body portion, a first tapered section, a second tapered section, a third tapered section and a fourth tapered section, the first tapered section is arranged adjacent to the main body portion, each tapered section is provided in a listed sequence and the tapered angles of each tapered section that is successively provided are different.

19. The electronic expansion valve according to claim 18, wherein the tapered angles of the second tapered section, the third tapered section and the fourth tapered section satisfy a following relationship:

$$\theta_3 > \theta_2,\ \theta_3 > \theta_4,\ \theta_4 > \theta_2;$$

wherein $\theta_2$ is the tapered angle of the second tapered section, $\theta_3$ is the tapered angle of the third tapered section, and $\theta_4$ is the tapered angle of the fourth tapered section.

20. The electronic expansion valve according to claim 19, wherein the third tapered section has a tapered angle $\theta_3$ in a range of $35°\pm10°$.

21. The electronic expansion valve according to claim 19, wherein the tapered angle $\theta_4$ of the fourth tapered section and the tapered angle of the third tapered section satisfy a following relationship:

$$\theta_3 - \theta_4 \approx 10°.$$

22. The electronic expansion valve according to claim 18, wherein the first tapered section has a tapered angle $\theta_1$ in a range of $50°\pm15°$.

23. The electronic expansion valve according to claim 18, wherein the tapered angle $\theta_2$ of the second tapered section satisfies a following relationship: $3° \leq \theta_2 \leq 10°$.

* * * * *